United States Patent

[11] 3,581,248

[72] Inventors Adrian J. De Vries
Elmhurst;
Thomas J. Wojcik, Mount Prospect, both of, Ill.
[21] Appl. No. 810,774
[22] Filed Mar. 26, 1969
[45] Patented May 25, 1971
[73] Assignee Zenith Radio Corporation
Chicago, Ill.

[54] ACOUSTIC FILTERS
1 Claim, 5 Drawing Figs.
[52] U.S. Cl. .................................................. 333/72,
310/8.1
[51] Int. Cl. .................................................... H04r 17/10,
H01v 7/00
[50] Field of Search .......................................... 333/30, 70
(S), 72; 310/8.1, 8.2

[56] References Cited
UNITED STATES PATENTS

| | | | |
|---|---|---|---|
| 2,886,787 | 5/1959 | Broadhead et al. | 333/72 |
| 3,311,854 | 3/1967 | Mason | 333/72X |
| 3,376,572 | 4/1968 | Mayo | 333/72X |
| 3,435,381 | 3/1969 | Tournois | 333/30 |
| 3,446,975 | 5/1969 | Adler et al. | 333/72X |
| 3,461,408 | 8/1969 | Onoe et al. | 333/72 |
| 3,464,033 | 8/1969 | Tournois | 333/72X |

*Primary Examiner*—Herman Karl Saalbach
*Assistant Examiner*—Tim Vezeau
*Attorney*—Francis W. Crotty ABSTRACT: A body of piezoelectric material propagates acoustic surface waves. Coupled to a surface of the body is a first transducer that launches the waves. Spaced on the same surface from the first device is a second transducer that responds to the launched waves. In order to reduce interference from reflections and increase efficiency, an end surface of the body is selectively located with respect to the adjacent transducer and is formed to define a particular angle with respect to the wave propagating surface. With the transducer elements in the form of interleaved combs of electrodes, absorption of reflections from an end surface is increased by effectively locating the end surface a precise fraction of an acoustic wavelength from the nearest comb electrode or tooth. Moreover, the response of the combined apparatus to signals being transmitted may be altered by changing either the angle that the end surface forms with respect to the propagating surface or by changing the spacing of the end surface from the transducer. The response also may be altered by depositing a different material on the wave propagating surface.

PATENTED MAY 25 1971　　　3,581,248

Inventors
Adrian J. De Vries
Thomas J. Wojcik

By *Francis W. Crotty*
　　　Attorney

ACOUSTIC FILTERS

BACKGROUND OF THE INVENTION

This invention pertains to acousto-electric filters. More particularly, it relates to solid-state tuned circuitry which involves interaction between a transducer coupled to a piezoelectric material and acoustic waves propagated in that material. The devices have been referred to by the term "SWIF" which is an abbreviation for surface wave integratable filter.

In copending application Ser. No. 721,038, filed Apr. 12, 1968, and assigned to the same assignee as the present application, there are disclosed and claimed a number of different acousto-electric devices in which acoustic surface waves propagating in a piezoelectric material interact with transducers coupled to the surface waves. In each of the devices disclosed in that application, the surface waves are launched in the body of piezoelectric material by a first or transmitting transducer and are caused, in one manner or another, to interact with a second transducer spaced along the surface from the first. In the simplest case, the first or transmitting transducer is coupled to a source of signals while the second or receiving transducer is coupled to a load, the signal energy being translated by the acoustic waves between the two transducers.

In practice, such devices have been demonstrated to exhibit characteristics useable in a number of different applications. In a television receiver, for example, acoustic filter systems have been included in the IF channel in order to impose the desired IF characteristic with trap or null points at selected frequencies spaced from the video IF carrier frequency and determined by the structure of the acoustic filters included in the system. As another example, an acoustic filter system may serve in an FM receiver as the discriminator to perform the necessary function of converting frequency changes to amplitude changes.

While the demonstrations thus far have been highly encouraging, one difficulty has been encountered that is attributable to the presence on the propagating surface of reflected waves. These reflected waves are produced by the receiving transducer itself and also by a portion of the initial waves that travel past the receiving transducer to the end of the piezoelectric substrate from which they are reflected back along the original path. Additionally, typical forms of transducers launch acoustic waves simultaneously in opposing directions but only one of them may be directed toward the receiving transducer. The other wave travels to an end surface of the piezoelectric substrate and there is reflected or turned back in the opposite direction. In any case, the reflected waves are delayed by a finite time interval so that, when finally interacting with the receiving transducer, they develop a time-delayed signal. In a television environment, this can result in the appearance of a "ghost" in the reproduced image. Also, to the extent the reflected waves do not properly interact with the receiving transducer, the efficiency of the device is reduced.

It is, accordingly, one object of the present invention to provide a new and improved acousto-electric filter in which interference from reflected acoustic surface waves is inhibited.

Another object of the present invention is to provide a new and improved acousto-electric filter in which undesirable interference from such reflected waves is inhibited while, at the same time, the reflected waves are advantageously utilized.

One reason for the great interest in acousto-electric filters is the fact that they are a solid-state device that may be fabricated by conventional integrated-circuit techniques. In the latter connection, they may be fabricated in combination or together with other active or passive devices as a single unitary assembly. Once produced, however, the resulting assembly is fixed as to those of its physical characteristics that ordinarily determine such parameters as sensitivity and selectivity.

It is, therefore, a further object of the present invention to provide a method of altering the frequency response of an acousto-electric filter after it has been fabricated.

It is still another object of the present invention to provide means for altering the frequency response of an acousto-electric filter without changing the frequency-determining characteristics of the transducer elements themselves.

SUMMARY OF THE INVENTION

The invention is applicable to an acoustic filter having an acoustic-wave-propagating substrate and a surface wave transducer coupled to a propagating surface of that substrate. The transducer interacts with surface waves propagating on a predetermined portion of the substrate. In accordance with one feature of the present invention, an end surface of that substrate, on the side of the transducer opposite the predetermined portion, forms an angle to that surface of a value selected to optimize wave reflection. In accordance with another feature of the invention, a layer of a material having wave propagating properties different from those of the substrate, is disposed on the propagating surface in order to modify its inherent propagation velocity and thereby alter the frequency response of the filter. Still another feature of the invention pertains to the spacing of an end surface of the substrate from the transducer such that surface waves reflected by that end surface combine with surface waves launched or received by the transducer in a manner to alter the frequency response of the filter.

The features of the present invention which are believed to be novel are set forth with particularity in the appended claims. The organization and manner of operation of the invention, together with further objects and advantages thereof, may best be understood by reference to the following description taken in conjunction with the accompanying drawing, in the several figures of which like reference numerals identify like elements and in which:

Figure 5:
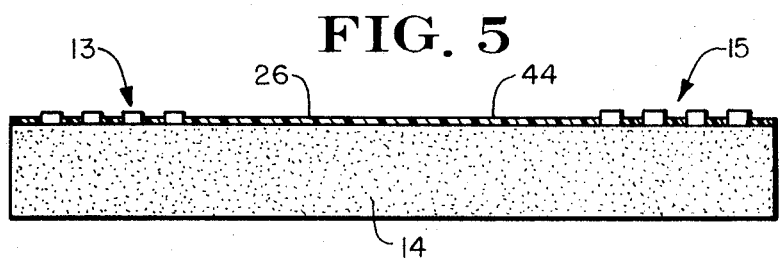

FIG. is a plot depicting the response curves of an acoustic filter under two different conditions; and FIG. 5 is a side-elevational view of yet another acoustic filter device.

Figure 1:
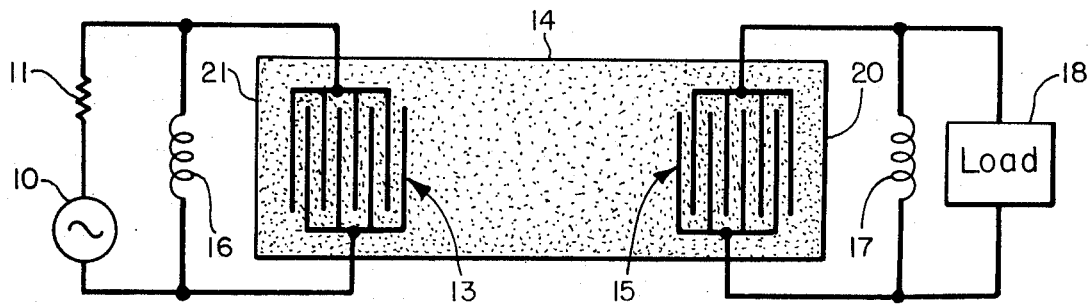
FIG. 1 is a partly schematic plan view of an acoustic filter system.

In FIG. 1, a signal source 10 in series with a resistor 11, which may represent the internal impedance of that source, is connected across and impedance-matched to an input transducer or surface wave interaction device 13 mechanically coupled to one major surface of a body of piezoelectric material in the form of a substrate 14. An output or second portion of the same surface of substrate 14 is, in turn, mechanically coupled to an output transducer 15 which is coupled to a load 18 with matched impedances. Shunted across transducers 13 and 15 are respective inductors 16 and 17 that match the transducers to their coupled input or output stages. These inductors typically are of a value to resonate with the clamped capacitance of the transducers at the assigned center frequency of the signals to be transmitted. This mode of tuning out the clamped capacitance is further described in the aforenoted copending application.

Transducers 13 and 15 in the simplest arrangement are identical and are constructed of two comb-type electrode arrays. The stripes or conductive elements of one comb are interleaved with the stripes of the other. The electrodes are of a material such as gold or aluminum which may be vacuum deposited or photoetched on a highly lapped and polished planar surface of the piezoelectric body. The piezoelectric material is one, such as PZT or quartz, that is propagative of acoustic waves. The distance between the centers of two consecutive stripes or teeth in each array is one-half of the acoustic wavelength of the signal wave for which it is desired to achieve maximum response.

Direct piezoelectric surface wave transduction is accomplished by the spatially periodic interdigital electrodes of transducer 13. Operating as a transmitter, a periodic electric field is produced when a signal from source 10 is fed to the electrodes and, through piezoelectric coupling, the electric signal is transduced to a traveling acoustic wave on substrate 14. This occurs when the stress components produced by the electric field in the piezoelectric substrate are substantially matched to the stress components associated with the surface wave mode. Source 10, for example, a portion of a television receiver, produces a range of IF signal frequencies, but due to the selective nature of the arrangement only a particular signal frequency and its intelligence-carrying sidebands are converted to a surface wave. More specifically, source 10 may be the tunable front end of a television receiver which selects a desired program signal for application to load 18 that, in this environment, comprises those stages of a television receiver that respond to the IF program signal in producing a television image and its associated audio program. The surface wave resulting in substrate 14 in response to the energization of transducer 13 by the IF output signal from source 10 is translated along the substrate to output transducer 15 where it is converted to an electrical output signal for application to load 18.

In a typical television IF embodiment, utilizing PZT as the piezoelectric substrate, the stripes of both transducer 13 and transducer 15 are approximately 0.5 mil wide and are separated by 0.5 mil for the application of an IF signal in the typical range of 40 —46 megahertz. The spacing between transducer 13 and transducer 15 is on the order of 0.05 inch and the width of the wave front is approximately 0.05 inch. This structure of transducers 13, 15 and substrate 14 acts as a cascaded set of tuned circuits with a resonant frequency of approximately 40 megahertz, the resonant frequency being determined, at least to a first order, by the spacing of the stripes.

The potential developed between any given pair successive stripes in electrode array 13 produces two waves traveling along the surface of substrate 14, in opposing directions, perpendicular to the stripes for the illustrative isotropic case of a ceramic poled perpendicularly to the surface. When the distance between the stripes is one-half the acoustic wavelength of the wave at the desired input frequency, or is an integral multiple thereof, relative maxima of the output wave are produced by piezoelectric transduction in transducer 15. For increased selectivity, additional electrode stripes are added to the comb patterns of transducers 13 and 15. Further modifications and adjustments are described in the aforementioned copending application for the purpose of particularly shaping the response presented by the filter to the transmitted signal. Moreover, as described and claimed in copending application Ser. No. 817,093, filed Apr. 17, 1969 in the name of Robert Adler et al. the entire region of substrate 14 need not be piezoelectric; it is sufficient, and sometimes desirable, to have the piezoelectric property exhibited only directly under the comb arrays.

As stated above, waves are launched by transducer 13 in opposing directions. The wave propagated to the right in FIG. 1 travels directly to transducer 15 where its energy preferably should be entirely transferred by way of that transducer to load 18. The transducing efficiency, however, less than 100 percent and as a result, one portion of the wave energy is reflected back toward transducer 13, another portion is absorbed by transducer 15 and a third portion passes through or beyond transducer 15. It can be shown that, with transducer 15 optimally tuned and terminated but without more, these portions are one-fourth, one-half and one-fourth, respectively, of the surface wave energy launched by transducer 13 in the direction of transducer 15.

The portion of the wave energy that passes through transducer 15 may be dispersed or redirected so as to avoid a second interaction with that transducer and consequent confusion of signal information. Serrating the end of the propagating surface beyond transducer 15 will disperse those waves, while forming the end of that surface at an acute angle to the direction of wave propagation will reflect the waves along a different path so that they do not again interact with the electrodes of that transducer. To the extent this portion of the wave energy thus is dissipated, or is otherwise attenuated, it is not used to develop an output signal. Similarly, the wave energy that is originally launched to the left of transducer 13, or directed away from transducer 15, may be dissipated so as not to be reflected for subsequent interaction with transducer 15 to develop a delayed signal. However, difficulty arises from that portion of the wave energy which is reflected by transducer 15 back to transducer 13. Upon rereflection at transducer 13 again to transducer 15, this wave energy develops a delayed signal that is not readily attenuatable without also suppressing the desired single path signal.

To the end of reducing such unwanted reflections and improving overall efficiency, the energy absorption of transducer 15 is increased. This is achieved by causing the substrate end surface beyond transducer 15 to be highly reflecting and by locating that end surface effectively an odd integral number of surface-wave quarter-wavelengths from transducer 15. The opposite end surface preferably is similarly characterized with reference to input transducer 13. In principle, perfect reflectivity from an end surface of the substrate, optimally located with respect to the adjacent transducer, can increase the efficiency of that transducer by three db and completely eliminate the reflected energy. In practice, complete reflection and precise location are not obtainable but they may be approached to such an extent that a significant degree of improvement is found to exist. The basic principles involved find an analogy in radio frequency wave-transmission line practice. When such a line is shorted at a point an odd number of quarter wavelengths beyond its connection to a load that presents the characteristic impedance of the line, or is left open a whole number of half-wavelengths beyond the connection to this load, all of the energy carried by the line is absorbed into the load. In both cases, all energy is reflected from the end of the line and returned to the load. This teaches that the location of the load is critical for optimum absorption of incident power into the load. In the present environment, the previously described tuned transducer 15 and its matched load 18 constitute a termination of an acoustic transmission line. The edge of the substrate beyond transducer 15 in a direction away from transmitting transducer 13 acts as a reflector of acoustic energy traveling beyond transducer 15 and experimentally it has been found that this edge should be bevelled and should be located one quarter acoustic wavelength, or an odd multiple thereof, from the center of the nearest stripe of the transducer for optimum energy transfer to load 18.

In order to create a highly reflective barrier at the end of the acoustic-line, the end surface is bevelled, as stated, or cut to form a particular angle to the wave propagating surface, namely, the angle which for the material of the substrate gives maximum reflection. At the same time, the end surface is located an odd integral number of surface-wave quarter-wavelengths from the center of the closest electrode in the associated transducer. Thus, in FIG. 2 the opposing end surfaces 23 and 24 of substrate 14, composed of PZT–4, are inclined at an angle $\alpha$ of 50° with respect to propagating surface 26 upon which are disposed respective input and output transducers 13 and 15. That is, it has been discovered that the reflection coefficient varies as the angle a is changed. For PZT-4, angle $\alpha$ is 50° to obtain an optimum reflection coefficient which is estimated to be 95 percent. In contrast, when the edge is formed so that angle $\alpha$ is 90° other conditions being the same, the reflected wave is estimated to have an amplitude of only 50 percent of the incident wave.

Figure 3:
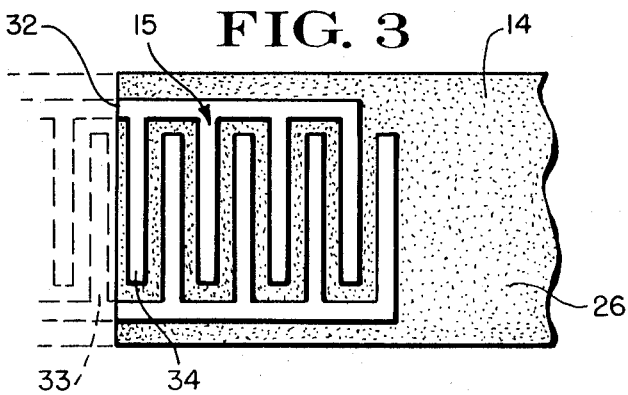
FIG. 3 is a fragmentary plan view of another acoustic filter system.

The arrangement shown in FIG. 3 features an end surface located to act directly as an effective part of the transducer itself. As depicted, substrate 14 carries an interleaved-comb-type transducing array 15 so disposed that the adjacent end surface 32 of the substrate is located in the middle of an elemental transducer that would be formed by two adjacent stripes 33 and 34 if the substrate and transducer were continued or extended outward from the location of that end surface as indicated by broken construction lines. That is, end surface 32, on the side of transducer 15 opposite the active propagating surface 26, is effectively located midway between the last actual and the next virtual interdigital tooth. Remembering that the tooth spacing is one-half wavelength at the frequency of maximum response, end surface 32 thus is spaced a quarter wavelength from the center of last actual tooth on the substrate. A wave incident to the transducer first traverses the transducer is reflected against the bevelled edge 32 and is redirected to traverse the transducer again. Consequently, it traverses the transducer twice and therefore the frequency response of a transducer with a bevelled edge located for optimum power transfer is equivalent to that of a transducer with twice the actual number of stripes. This, incidentally, narrows the frequency response.

Figure 4:
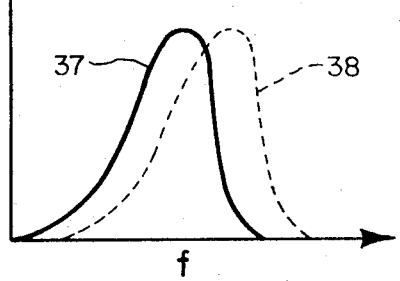

When filters of the type described are composed of materials in which the sound velocity varies somewhat from one batch to the next, it is desirable to be able to control the frequency of maximum response after the filter has been fabricated and the transducer electrode spacings thus have been fixed. That is, as fabricated, the filter may initially exhibit a frequency response curve 37 as shown in FIG. 4. Either to correct a variation in sound velocity or to allow tuning in a particular system, it may be desired to alter the shape or position of that curve so as generally to occupy a higher frequency range as indicated by curve 38 in FIG. 4. To achieve such a shift in the frequency of maximum response, the location of end surface 32 relative to transducer array 15 is changed as by cutting or grinding the end surface so as to move it, in effect, slightly toward the transducer. Recalling that the reflecting edge or end surface 32 acts like a mirror in that it establishes a virtual image of the actual transducer, shifting the position of that reflective surface changes the average interelectrode or tooth spacing of the combined virtual and actual transducers as viewed in terms of interaction of both the originally created and reflected waves. The same effect is obtained in the filter of FIG. 2 by removing material from the end surface adjacent to the transducer the response of which is to be altered. In all of these cases, the frequency of maximum response is shifted by an amount which in practice is limited to the order of 50 /N percent, where N is the number of electrodes or teeth in the associated transducer; this limitation exists in practice because only a fraction of a wavelength can be removed in any effort to change the response frequency. The frequency response likewise may be changed in the filter of FIG. 2 by grinding or cutting away from end surfaces 23 or 24, or both, in order to change the value of angle $\alpha$. In general, the effect is to broaden the response by reducing the effective number of virtual stripes that are added.

Figure 2:
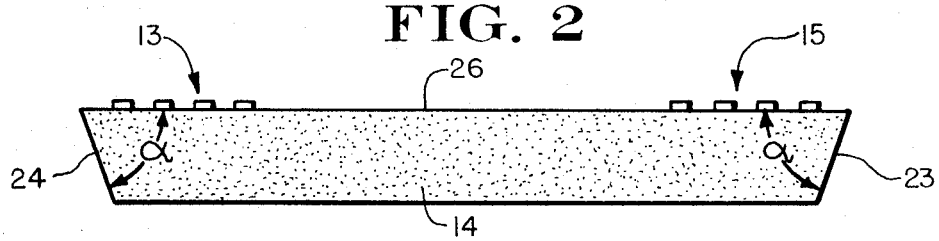
FIG. 2 is a side-elevational view of a particular acoustic filter structure.

Further in connection with the use of slanted or bevelled end surfaces as in the filter of FIG. 2, it may be noted that the effective location of those end surfaces with respect to their respective transducers has been found to be slightly different than the physical distance from the center of the outermost transducer electrode to the outer edge of wave propagating surface 26 )(the apex of angle $\alpha$). That is, the effective location of the end surface appears to be along a line situated slightly toward the associated transducer from the outermost edge of the propagating surface.

As discussed, fabrication of the acoustic filter in accordance with a predetermined pattern and spacing of the interdigital teeth yields a device that exhibits a maximum response at a selected frequency. That frequency is primarily a function of the interelectrode spacing in relation to the velocity of propagation of the surface waves along the substrate. In FIG. 5, the acoustic filter includes a substrate 14 having a wave propagation surface 26 along which are disposed respective input and output transducing electrode array 13 and 15. Affixed directly to propagating surface 26, particularly in the transducer regions, is a layer of a nonconductive material 44 that has an effective wave-propagation velocity different from that of surface 26. In practice, this may be an actual difference in any one or more of specific wave velocities, masses or other acoustic properties. In one exemplary embodiment operating at seven megahertz, material 44 simply is a spray-type lacquer having a thickness on the order of 0.005 inch. Quick drying spray enamels also are conveniently employed. By such techniques, the effective surface wave velocity, and hence the frequency of maximum response, can readily be changed in the order of 1 percent. With that degree of correction, a slight increase in attenuation of the transmitted signals occurs, but this is generally of minor significance.

The foregoing techniques and structures impart and advantageous degree of flexibility in the fabrication and use of acousto-electric filters. The impairment in performance which may result by reason of the presence of undesired reflected waves can be obviated either by inhibiting or by actually making use of those reflected waves. In addition, structural and procedural approaches have been disclosed which enable a useable degree of tuning for adjustment of the frequency of maximum response of the filter. These approaches are beneficial either for the purpose of correcting manufacturing variations or of permitting adjustment of the filter frequency with respect to operation of the system in which the filter is utilized.

While particular embodiments of the present invention have bee shown and described, it will be obvious to those skilled in the art that changes and modifications may be made without departing from the invention in its broader aspects. Accordingly, the aim in the appended claims is to cover all such changes and modifications as fall within the true spirit and scope of the invention.

We claim:

1. In an acoustic filter having an acoustic-wave-propagating substrate and a surface-wave transducer actively coupled to a propagating surface of that substrate for interacting with surface waves propagating on a predetermined portion of the substrate, said transducer including an array of interleaved combs of conductive electrodes defining a pattern of spaced interdigital teeth, the improvement in which the end surface of said substrate on the side of said transducer opposite said predetermined portion is effectively located midway between an actual one of said teeth and an adjacent virtual image of said one tooth.